(12) United States Patent
Nevarez et al.

(10) Patent No.: US 10,688,894 B2
(45) Date of Patent: Jun. 23, 2020

(54) RECLINER SOFA SYSTEM FOR ECONOMY CLASS SEAT

(71) Applicant: Safran Seats USA LLC, Gainesville, TX (US)

(72) Inventors: Rodolfo Nevarez, Chihuahua (MX);
David Morales, Chihuahua (MX);
Daniel Chavarria, Chihuahua (MX);
Jose Madrigal, Chihuahua (MX);
Mario Herrera, Chihuahua (MX);
Teresa Antillon, Chihuahua (MX);
Foek Le, Arlington, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 16/262,459

(22) Filed: Jan. 30, 2019

(65) Prior Publication Data

US 2020/0139861 A1 May 7, 2020

Related U.S. Application Data

(60) Provisional application No. 62/754,394, filed on Nov. 1, 2018.

(51) Int. Cl.
*B64D 11/06* (2006.01)
*B60N 2/32* (2006.01)
(Continued)

(52) U.S. Cl.
CPC ............... *B60N 2/32* (2013.01); *B60N 2/242* (2013.01); *B60N 3/06* (2013.01); *B61D 33/005* (2013.01);
(Continued)

(58) Field of Classification Search
CPC .. B64D 11/0627; B64D 11/0641; B60N 2/34; B60N 2/36; A47C 7/626; A47C 7/628; B60R 7/043
See application file for complete search history.

(56) References Cited

U.S. PATENT DOCUMENTS

| 226,729 A | 4/1880 | Eastman |
| 1,548,334 A | 8/1925 | Sebell |

(Continued)

FOREIGN PATENT DOCUMENTS

| DE | 3842733 A1 * | 6/1990 | ............. B60N 3/063 |
| DE | 10143807 A1 * | 3/2003 | ........... B60N 2/3015 |

(Continued)

OTHER PUBLICATIONS

International Patent Application No. PCT/US2018/025723, International Search Report and Written Opinion, dated Jul. 12, 2018.

*Primary Examiner* — Timothy J Brindley
(74) *Attorney, Agent, or Firm* — Kilpatrick Townsend & Stockton LLP (57) ABSTRACT

Described are recliner sofa systems for a passenger seat. The passenger seat includes a seat back assembly and a seat base assembly. The seat back assembly includes an upper back support and a lower back support, and the lower back support is movable relative to the upper back support between a stowed position and a deployed position. The seat base assembly includes a support and a seat base, and the seat base is movable relative to the support between a stowed position and a deployed position. The seat base in the deployed position and the lower back support in the deployed position together define a foot cavity configured to receive a foot of a passenger.

16 Claims, 8 Drawing Sheets

(51) Int. Cl.
    *B60N 3/06*         (2006.01)
    *B60N 2/24*         (2006.01)
    *B61D 33/00*       (2006.01)
    *B63B 29/04*       (2006.01)

(52) U.S. Cl.
    CPC ......... *B63B 29/04* (2013.01); *B63B 2029/043* (2013.01); *B64D 11/0643* (2014.12)

(56) References Cited

U.S. PATENT DOCUMENTS

| | | | |
|---|---|---|---|
| RE17,755 E | 7/1930 | Graham | |
| 3,761,124 A * | 9/1973 | Weik | B60N 2/7029 297/112 |
| 5,690,384 A * | 11/1997 | Rossi | B60N 2/58 297/228.13 |
| 5,740,989 A * | 4/1998 | Daines | B64D 11/0696 244/118.6 |
| 5,758,924 A * | 6/1998 | Vishey | A47C 7/467 297/284.4 |
| 6,079,773 A * | 6/2000 | Hassan | B60N 2/90 297/188.13 |
| 6,082,815 A * | 7/2000 | Xiromeritis | A47C 7/70 297/124 |
| 6,869,121 B2 * | 3/2005 | Kayumi | B60N 2/01 296/37.15 |
| 6,877,807 B2 * | 4/2005 | Mizuno | B60N 2/305 297/188.08 |
| 8,888,189 B2 * | 11/2014 | Tamura | B60N 2/0232 297/423.19 |
| 8,936,214 B2 * | 1/2015 | Foucher | B64D 11/06 244/118.6 |
| 9,650,145 B2 * | 5/2017 | Lambert | B60N 2/0284 |
| 10,336,262 B2 * | 7/2019 | Mozurkewich | B60R 7/043 |
| 2004/0051003 A1 | 3/2004 | Cheung | |
| 2008/0315637 A1 * | 12/2008 | Ghisoni | B60N 2/5825 297/216.13 |
| 2010/0194133 A1 * | 8/2010 | Nakamura | B60R 7/043 296/37.8 |
| 2014/0132040 A1 * | 5/2014 | Arakawa | B60N 2/6009 297/112 |

FOREIGN PATENT DOCUMENTS

| | | |
|---|---|---|
| JP | H0681822 U | 11/1994 |
| WO | 2019089075 A1 | 5/2019 |

* cited by examiner

RECLINER SOFA SYSTEM FOR ECONOMY CLASS SEAT

CROSS REFERENCE TO RELATED APPLICATIONS

This application is related to and claims priority benefits from U.S. Provisional Application Ser. No. 62/754,394 ("the '394 application"), filed on Nov. 1, 2018, entitled "RECLINER SOFA SYSTEM FOR ECONOMY CLASS SEAT The '394 application is hereby incorporated in its entirety by this reference.

FIELD OF THE INVENTION

The field of the invention relates to passenger seats, and, more particularly, to a recliner sofa system for a passenger seat.

BACKGROUND

Passenger vehicles, such as aircraft, buses, trains, ships, and automobiles, include passenger seats for passengers to sit in and utilize during travel. Sometimes, passenger seats are subdivided into classes based on the amount of living space offered by the particular seat. For example, in recent years, some airlines have offered first class seats (having the most living space), business class seats (having moderate living space), premium economy seats (having reduced living space), and regular economy seats (having the least amount of living space). In the economy class, the passenger's space and comfort is severely constrained by commercial considerations because airlines are forced to continuously reduce living space by introducing more seats to achieve a desirable level or revenue. Such limited space and comfort generally limits basic activities of a passenger in the seat such as sleeping or stretching. On the other hand, economy class seats that are not sold represent lost revenue for the airline. Therefore, there is still a need for a passenger seat that enhances the passenger's comfort while providing the airlines with new revenue streams.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat assembly includes a seat back assembly and a seat base assembly. The seat back assembly includes an upper back support and a lower back support, and the lower back support is movable relative to the upper back support between a stowed position and a deployed position. The seat base assembly includes a support and a seat base, and the seat base is movable relative to the support between a stowed position and a deployed position. The seat base in the deployed position and the lower back support in the deployed position together define a foot cavity configured to receive a foot of a passenger.

In some embodiments, the support of the seat base assembly includes a forward end and an aft end, and the seat base is movably connected to the forward end of the support. In various embodiments, the passenger seat assembly includes a covering member connecting the lower back support of the seat back assembly with the seat base, and the covering member at least partially defines the foot cavity when the seat base and lower back support are both in the deployed position. In some examples, the covering member includes a top cover and a side cover.

In various embodiments, the seat back assembly includes a frame supporting the upper back support and the lower back support, and when the lower back support is in the deployed position, an opening to the foot cavity is defined in the frame. In certain embodiments, the seat base is movable to an intermediate deployed position between the stowed position and the deployed position and the lower back support is further movable to an intermediate deployed position between the stowed position and the deployed position. In various examples, the seat base in the intermediate deployed position and the lower back support in the intermediate deployed position together define an intermediate foot cavity configured to receive a foot of a passenger, and a size of the intermediate foot cavity is less than a size of the foot cavity. In some embodiments, the seat base includes a base cushion and a seat pan, and wherein the support includes a support cushion.

According to certain embodiments of the present invention, a passenger seat assembly includes a seat back assembly and a seat base assembly. The seat back assembly includes a frame supporting an upper back support and a lower back support, and the lower back support is movable relative to the upper back support between a stowed position and a deployed position. The seat base assembly includes a support and a seat base, and the seat base is movable relative to the support between a stowed position and a deployed position. The seat base in the deployed position and the lower back support in the deployed position together define an opening through the frame.

In some embodiments, the lower back support is movable in a forward direction relative to the lower back support during a deployment motion of the lower back support from the stowed position to the deployed position, and the seat base is movable in the forward direction relative to the support during a deployment motion of the seat base from the stowed position to the deployed position. In various embodiments, the passenger seat assembly includes a covering member connecting the lower back support of the seat back assembly with the seat base such that the lower back support is movable with the seat base. In various examples, the covering member, lower back support, and seat base together define a foot cavity configured to receive a foot of a passenger when the lower back support is in the deployed position and the seat base is in the deployed position, and the opening through the frame provides access to the foot cavity. In certain embodiments the covering member includes a top cover and a side cover.

In various embodiments, the passenger seat assembly includes a lock configured to selectively retain the lower back support and the seat base in the stowed position. In some embodiments, the seat base assembly includes a biasing member biasing the seat base towards the deployed position.

According to certain embodiments of the present invention, a passenger seat arrangement includes a forward passenger seat and an aft passenger seat. The forward passenger seat includes a seat back assembly and a seat base assembly. The seat back assembly includes an upper back support and a lower back support, and the lower back support is movable relative to the upper back support between a stowed position and a deployed position. The seat base assembly includes a support and a seat base, and the seat base is movable relative to the support between a stowed position and a deployed position; and an aft passenger seat. The seat base in the deployed position and the lower back support in the deployed position together define a foot cavity for the aft passenger seat.

In various embodiments, the seat base in the deployed position and lower back support in the deployed position further define an opening through a frame of the seat back assembly providing access to the foot cavity. In some embodiments, the forward passenger seat includes a covering member connecting the lower back support with the seat base, and the covering member at least partially defines the foot cavity. In various examples, the covering member includes a non-rigid material.

In some embodiments, the lower back support is movable in a forward direction from the stowed position to the deployed position, and the seat base is movable in the forward direction from the stowed position to the deployed position. In certain examples, in the deployed position, the seat base is at an oblique angle relative to the support.

According to certain embodiments of the present invention, a passenger seat includes a seat back assembly. The seat back assembly includes a frame, an upper back support, and a lower back support. The lower back support is movable relative to the upper back support between a stowed position and a deployed position, and, in the deployed position, the lower back support defines an opening through the frame.

According to certain embodiments of the present invention, a passenger seat assembly includes a seat base assembly. The seat base assembly includes a support and a seat base. The seat base is movable relative to the support between a stowed position and a deployed position, and the seat base in the deployed position at least partially defines a foot cavity configured to receive a foot of a passenger.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a recliner sofa system for passenger seat assemblies. While the recliner sofa system is discussed for use with aircraft seats, they are by no means so limited. Rather, embodiments of the recliner sofa system may be used in passenger seats or other seats of any type or otherwise as desired.

Figure 1:
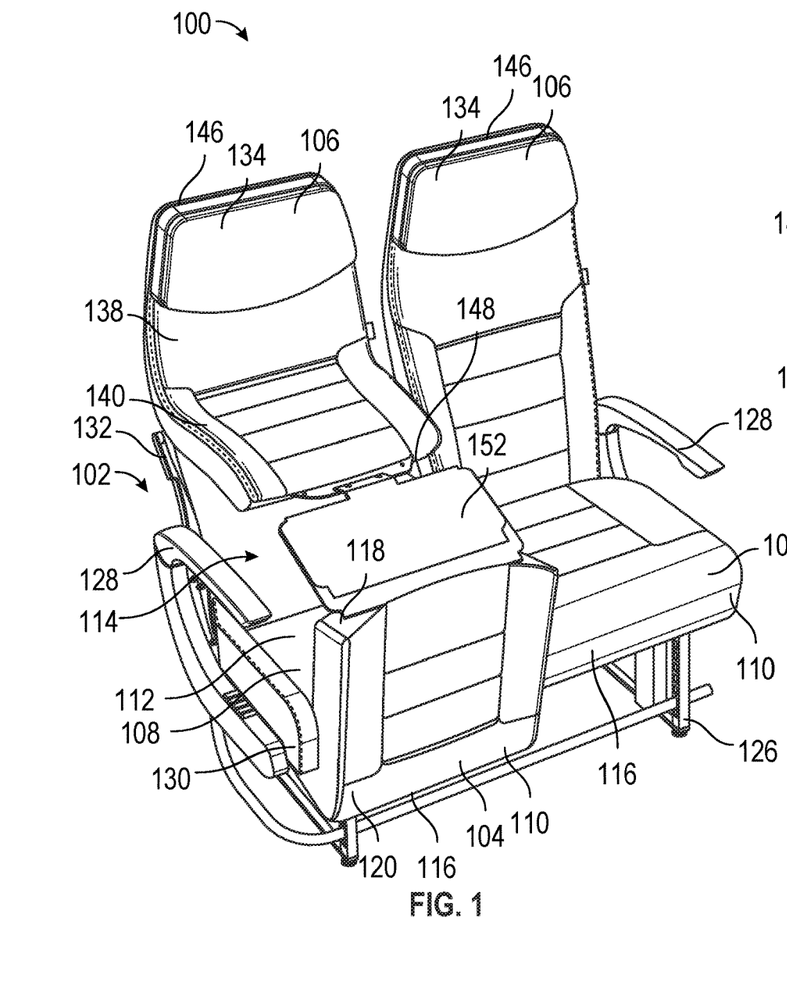
FIG. 1 is a perspective view of a passenger seat arrangement with a recliner sofa system according to certain embodiments of the present invention.
Figure 2:
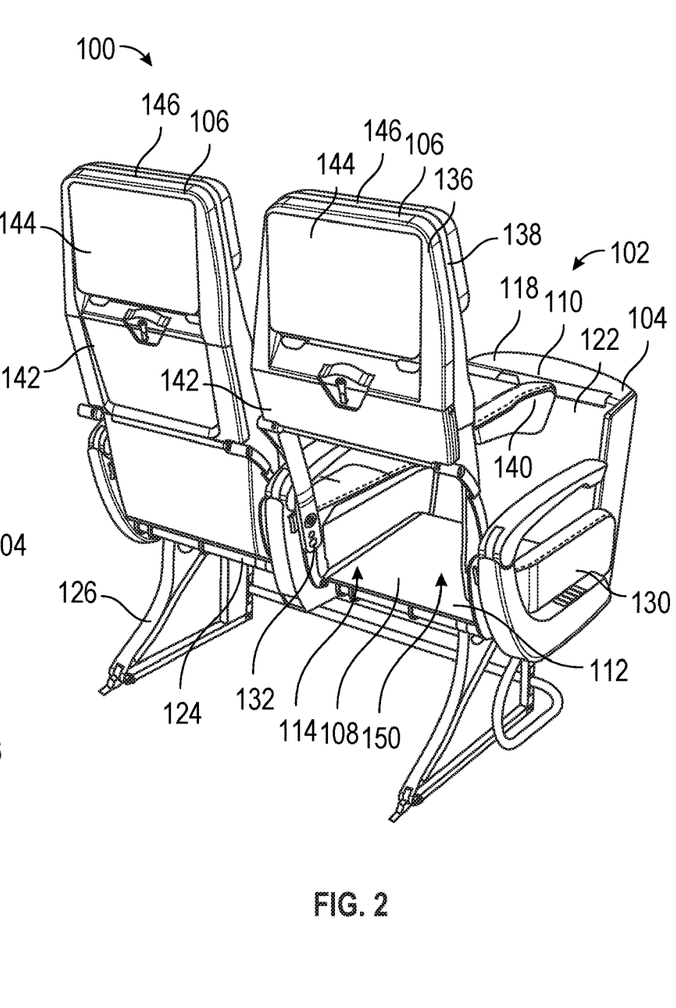
FIG. 2 is another perspective view of the passenger seat arrangement of FIG. 1.

FIGS. 1 and 2 illustrate a passenger seat assembly 100 with a recliner sofa system 102 according to certain embodiments of the present invention. In various examples, the passenger seat assembly 100 is an economy class passenger seat assembly. The passenger seat assembly 100 includes a seat base assembly 104 and at least one seat back assembly 106. The seat base assembly 104 includes at least one base support 108 and at least one seat base 110. In the present example, the passenger seat assembly 100 is capable of carrying a quantity of two passengers, and accordingly has two seat back assemblies 106 and two seat bases 110. It will be appreciated that in various other examples, the passenger seat assembly 100 can be capable of carrying any desired number of passengers, such as one passenger, two passengers, three passengers, four passengers, or any other desired number of passengers. As such, the number of seat back assemblies 106, base supports 108, and seat bases 110 should not be considered limiting on the current disclosure.

As mentioned, the seat base assembly 104 includes the base support 108 and the seat base 110. The base support 108 includes a base support surface 112 that at least partially forms a foot cavity 114 of the recliner sofa system 102 as discussed below. In various examples, a support cushion is provided with the base support 108, and the support cushion optionally defines the base support surface 112.

The seat base 110 includes a forward end 116, an aft end 118, a top surface 120, and a bottom surface 122. In some cases, a seat pan of the seat base 110 forms the bottom surface 122 and a seat cushion of the seat base 110 forms the top surface 120, although they need not in other examples. When included, the seat pan may include a rigid or semi-rigid material. In various examples, the seat base 110 is movably connected to the seat base assembly 104 such that the seat base 110 is movable between a stowed position (see, e.g., FIG. 3) and a deployed position (see FIGS. 1 and 2). As discussed in detail below, in the deployed position, the seat base 110 at least partially forms the foot cavity 114.

In some cases, the forward end 116 or a portion of the seat base proximate to the forward end 116 is movably connected to the seat base assembly 104 such that the seat base 110 can pivot in a forward direction to move from the stowed position to the deployed position. The seat base 110 may be movably connected to various components of the seat base assembly 104 including, but not limited to, the base support 108, a base frame tube 124, a leg assembly 126, a frame component of the seat base assembly, combinations thereof, or various other suitable locations. In certain aspects, connectors such as hinges, pins, bolts, screws, brackets, combinations thereof, or other suitable connectors may movably connect the seat base 110 to the seat base assembly 104. In various examples, in the stowed position, the bottom surface 122 of the seat base 110 is adjacent to the base support surface 112 and, in the deployed position, the bottom surface 122 of the seat base 110 is spaced apart from the base support surface 112. As best illustrated in FIG. 2, in the deployed position, the bottom surface 122 of the seat base 110 may at least partially form the foot cavity 114. In various example, in the deployed position, the seat base 110 may extend at an oblique angle relative to the base support 108. In certain aspects, the positioning of the seat base 110 at the oblique angle in the deployed position may at least partially maintain the seat base 110 in the deployed position.

In some examples, the seat base assembly 104 may optionally include one or more armrests 128, although they need not in other examples. In some examples, the seat base assembly 104 includes a seat guide 130 that facilitates positioning of a seat base 110 in the stowed position as discussed below, although in other examples, the seat guide 130 may be omitted.

The seat back assembly 106 includes a frame 132, a forward surface 134, an aft surface 136, an upper back support 138, and a lower back support 140. In various examples, the forward surface 134 is the surface that the passenger may contact when sitting in the seat. The aft surface 136 may optionally include various components such as a tray table 142, an In-Flight Entertainment (IFE) monitor 144, storage pouch, or other components as desired.

The upper back support 138 includes a top end 146 of the seat back assembly 106, and the lower back support 140 includes a bottom end 148. In certain examples, the lower back support 140 is movable relative to the upper back support 138 such that the lower back support 140 can move between a stowed position (see, e.g., FIG. 3) and a deployed position (see, e.g., FIGS. 1 and 2). In various examples, in the deployed position, the lower back support 140 at least partially forms the foot cavity 114. As illustrated in FIGS. 1 and 2, in the deployed position, the bottom end 148 of the lower back support 140 is spaced apart from the frame 132 such that an opening 150 to the foot cavity 114 is defined in the frame 132. In certain cases, the lower back support 140 is movably connected to various components of the seat back assembly 106. For example, the lower back support 140 may be movably connected to the upper back support 138, the frame 132, combinations thereof, or various other suitable components. Connectors such as hinges, pins, bolts, screws, brackets, combinations thereof, or other suitable connectors may movably connect the lower back support 140 to the seat back assembly 106.

In some optional examples, in addition to the seat base assembly 104 and the seat back assembly 106, the recliner sofa system 102 may further include a covering member 152 that at least partially forms the foot cavity 114 when the seat base 110 and the lower back support 140 are not in the stowed position. In other examples, the covering member 152 may be omitted. In some examples, the covering member 152 is connected to the seat base 110 and the lower back support 140. In various aspects, the covering member 152 is connected to the aft end 118 of the seat base 110 and the bottom end 148 of the lower back support 140. In some examples, the covering member 152 may be constructed from a rigid material such as various metals, composites, plastics, etc.; however, in other examples, the covering member 152 may be constructed from a flexible material such as fabrics, plastics, or other materials that can change shape. In certain aspects, the covering member 152 (or components forming the foot cavity 114) includes a material that visually conceals a passenger's feet. Optionally, the covering member 152 (or other component forming the foot cavity 114) includes various odor control materials. Various visual decals or other designs may be provided on the components forming the foot cavity 114, including, but not limited to, airline logos or colors, signs or warnings that the seat is being used, etc. In certain cases, when the seat base 110 is in the stowed position, the covering member 152 may be positioned between the base support surface 112 and the bottom surface 122 of the seat base 110.

In some examples, the seat base assembly 104 includes a locking mechanism that locks the seat base 110 in the stowed position and in the deployed position. The locking mechanism may be mechanical locks (e.g., keys, clips, hooks, pins, clasps, or other suitable locks). In other examples, the cushion locks may be electronically controlled (e.g., magnets, locks unlocked by a switch on the passenger seat assembly 100, by a controller on or remote from the passenger seat assembly 100, etc.) In certain aspects, the locking mechanism is remotely activated such that the seat base 110 can be selectively moved from the stowed position or the deployed position. In some cases, the seat base assembly 104 includes a biasing member such as a spring or other suitable device that biases the seat base 110 towards the deployed position. The seat back assembly 106 may similarly include a locking mechanism that selectively locks the lower back support 140 in the stowed position and in the deployed position, and may similarly optionally include a biasing member that biases the lower back support towards the deployed position.

FIGS. 3-6 illustrate an example of a passenger seat arrangement 301 with two passenger seat assemblies 100, and each passenger seat assembly 100 includes the recliner sofa system 102. Compared to the seat base assembly 104 of FIGS. 1 and 2, each seat base assembly 104 of FIGS. 3-6 further includes a leg rest 354; however, the disclosure of the leg rest 354 should not be considered limiting on the current disclosure. Compared to the covering member 152 of FIGS. 1 and 2, the covering member 152 of FIGS. 3-6 includes a top covering member and side covering members such that the foot cavity 114 is enclosed when defined by the recliner sofa system 102 (i.e., access to the foot cavity 114 is only through the opening 150).

Figure 3:
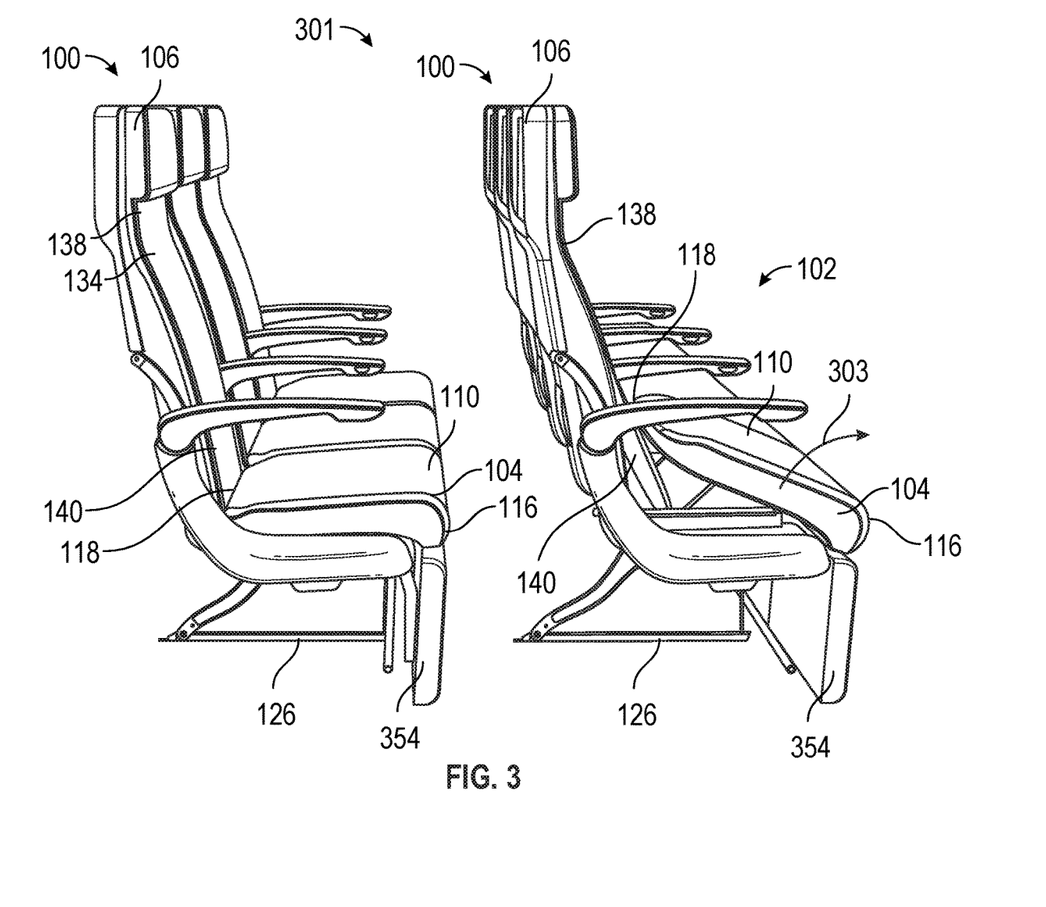
FIG. 3 is a perspective view of a passenger seat arrangement with a recliner sofa system being deployed according to certain embodiments of the present invention.

FIGS. 3-6 illustrate an example of a deployment movement of the recliner sofa system 102. As illustrated in FIG. 3, in some examples, after the locking mechanism of the seat base assembly 104 and/or of the seat back assembly 106 is unlocked, the seat base 110 and/or lower back support 140 may move to a first intermediate deployed position (represented by arrow 303). In some cases, in the first intermediate deployed position, the seat base 110 and/or lower back support 140 may define an intermediate foot cavity that is configured to receive a foot of the passenger but has a size or volume that is less than the foot cavity 114.

Figure 4A:
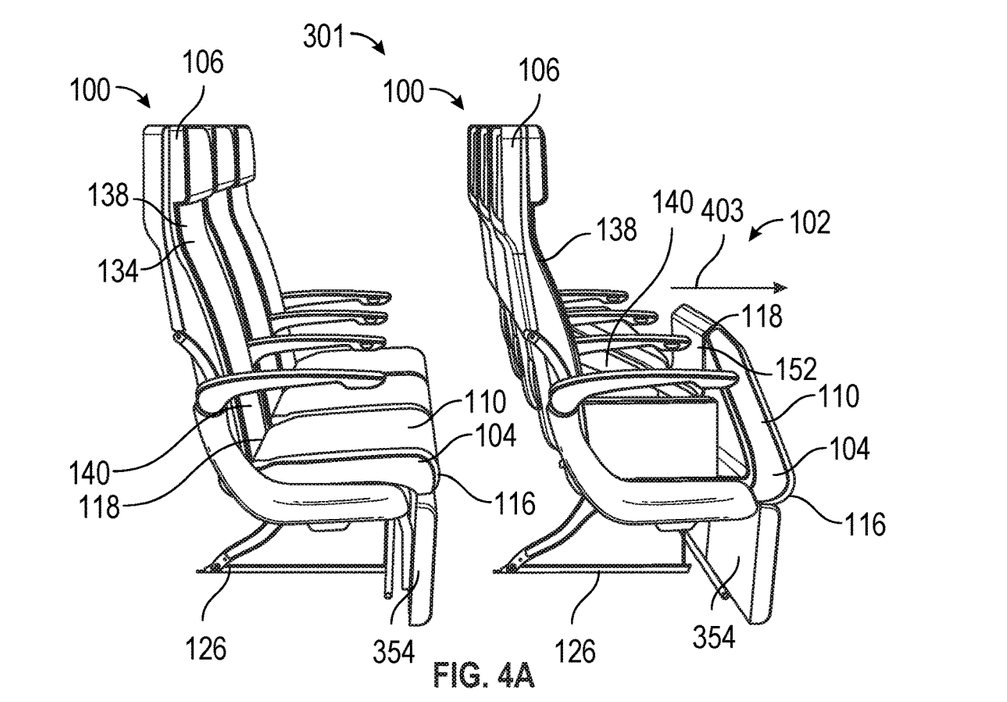
FIG. 4A is another perspective view of the passenger seat arrangement of FIG. 3 with the recliner sofa system being deployed.
Figure 4B:
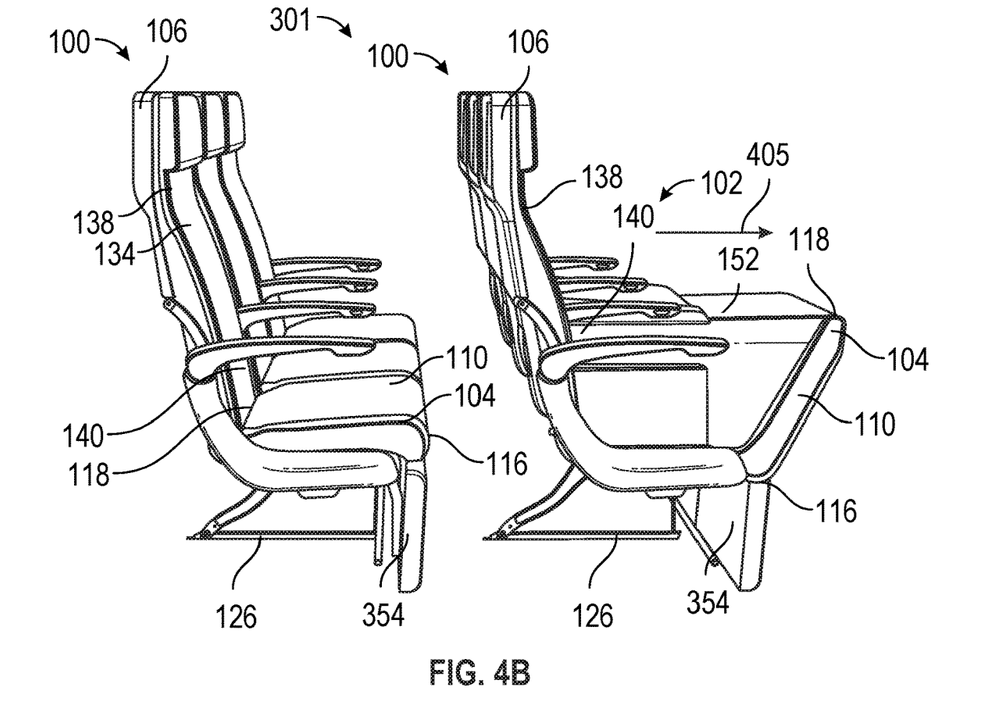
FIG. 4B is another perspective view of the passenger seat arrangement of FIG. 3 with the recliner sofa system being deployed.

FIGS. 4A and 4B illustrate the seat base 110 and lower back support 140 moved to additional intermediate deployed positions (represented by arrows 403 and 405). Similar to the first intermediate deployed position, the intermediate deployed positions illustrated in FIGS. 4A and 4B may define additional intermediate foot cavities that can receive a foot of the passenger but have a size or volume that is less than the foot cavity 114. In some cases, the seat base 110 and lower back support 140 are moved through the intermediate deployed positions through biasing members of the seat base assembly 104 and the seat back assembly 106. In various aspects, a passenger may push on the seat base 110 and/or lower back support 140 to move the seat base 110 and lower back support 140 through the intermediate deployed positions.

Figure 5:
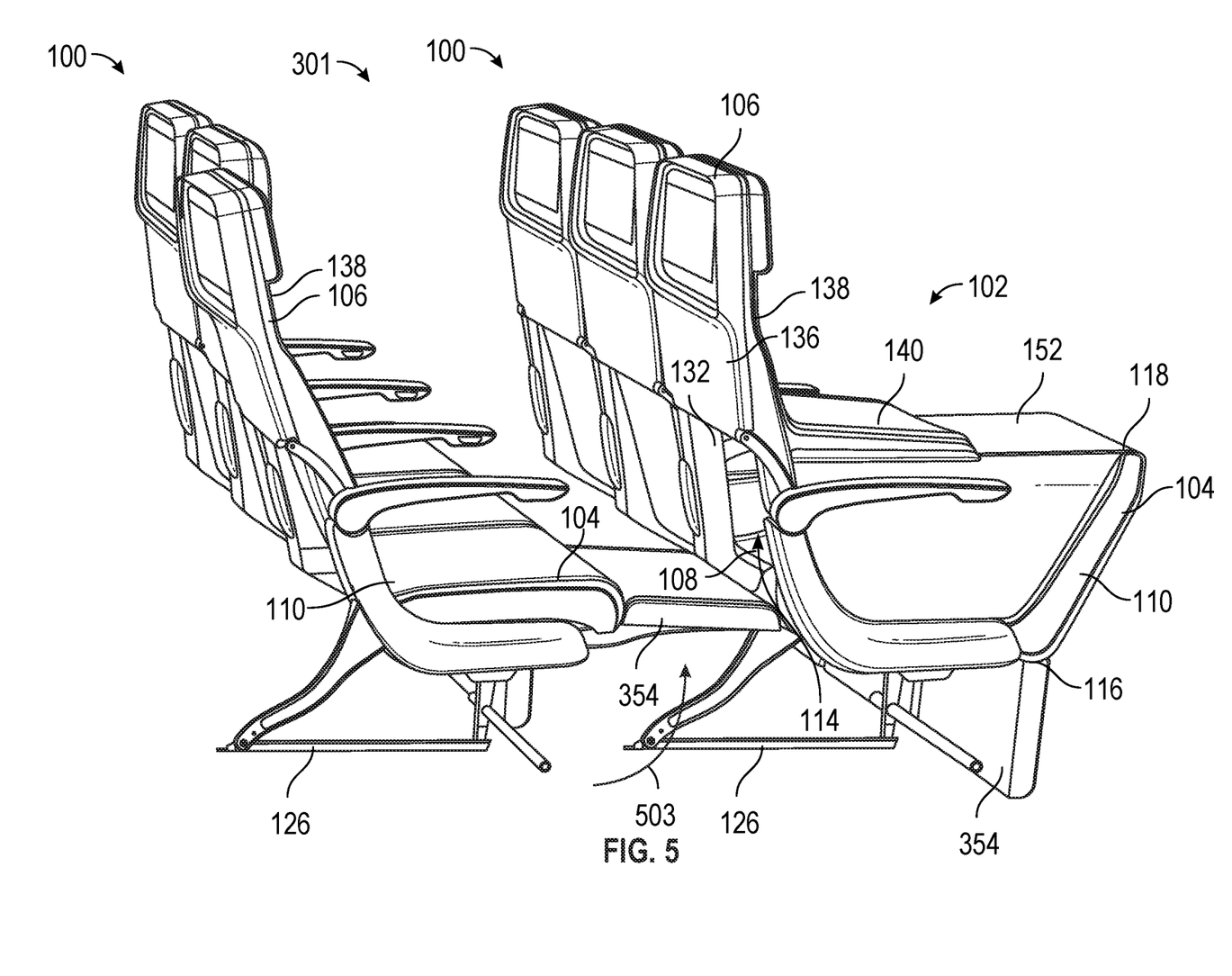
FIG. 5 is another perspective view of the passenger seat arrangement of FIG. 3 with the recliner sofa system being deployed.
Figure 6:
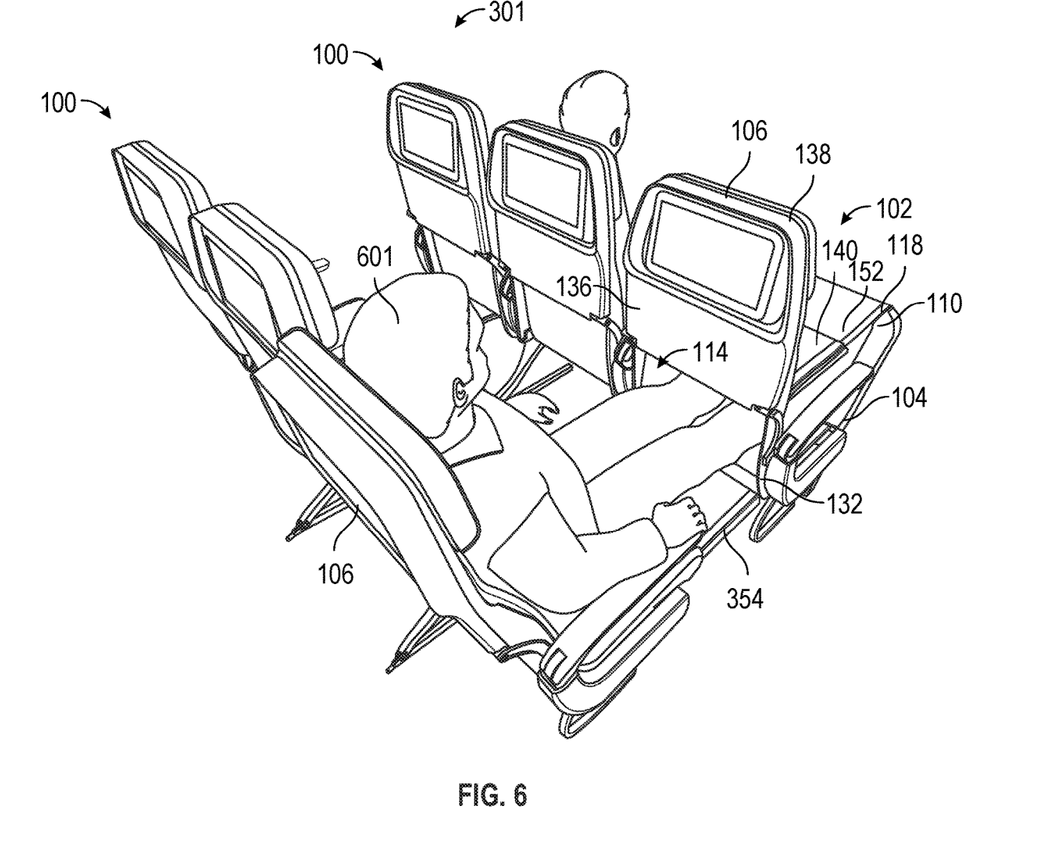
FIG. 6 is a perspective view of a passenger utilizing the passenger seat arrangement with the recliner sofa system of FIG. 3.

FIGS. 5 and 6 illustrate the seat base 110 and the lower back support 140 in the fully deployed positions to define the foot cavity 114. The foot cavity 114 may have a maximum size or volume compared to the intermediate foot cavities. As illustrated in FIG. 6, the passenger 601 may position her or his feet through the opening 150 in the frame 132 and into the foot cavity 114. Optionally, and as illustrated in FIG. 5, the leg rest 354 may be moved (represented by arrow 503) from a stowed position (see FIGS. 3-4B) to a deployed position to support the passenger's legs while his or her feet are within the foot cavity 114.

In some examples, the lower back support 140 and/or the covering member 152 in the fully deployed positions may optionally form an IFE surface that may be utilized by a passenger of an adjacent seat. For example, the forward surface 134 of the lower back support 140 and the covering member 152 may form a table surface that can be utilized by the passenger of the adjacent seat. Various other IFE components or devices may be provided when the lower back support 140 and covering member 152 are in the fully deployed positions.

FIGS. 7-12 illustrate another example of a passenger seat arrangement 701 with a plurality of passenger seat assemblies 100, and each passenger seat assembly 100 includes the recliner sofa system 102. In addition, similar to the passenger seat arrangement 301, each seat base assembly 104 includes the leg rest 354. As illustrated in FIGS. 7-12, the passenger seat arrangement 701 may be provided in a cabin 705 of an aircraft 707, although it may be provided in various other passenger vehicles as desired. FIGS. 7-12 illustrate another exemplary method of deploying the recliner sofa system 102.

Figure 7:
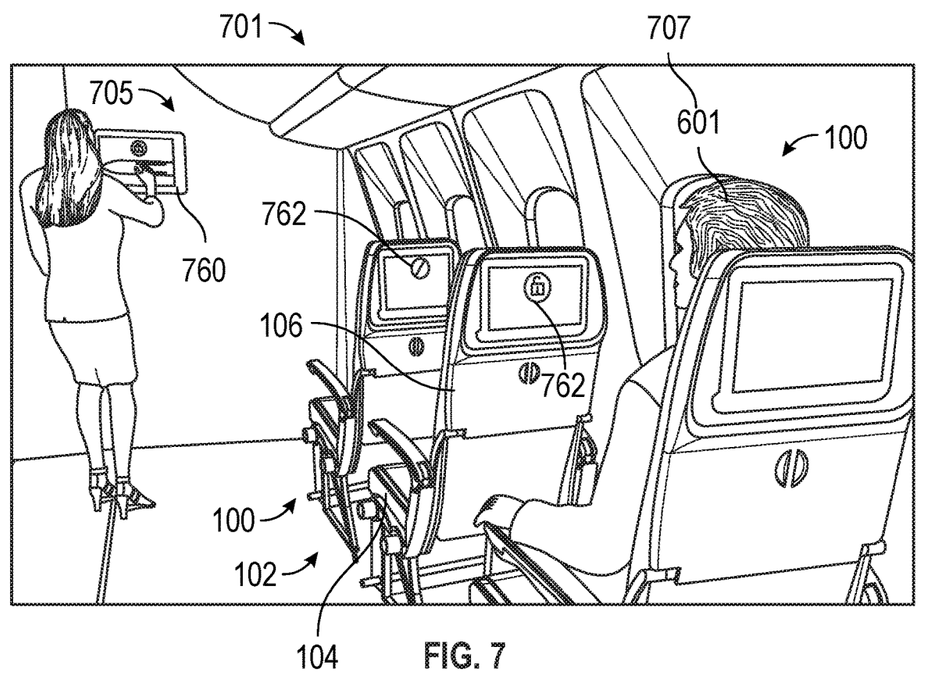
FIG. 7 is a perspective view of a passenger seat arrangement with a recliner sofa system according to certain embodiments of the present invention.

As illustrated in FIG. 7, in some examples, the recliner sofa system 102 may be controlled by a master lock 760. The master lock 760 may selectively provide access to the recliner sofa system 102, and may optionally provide various indicators 762 when the recliner sofa system 102 is activated. In some cases, after the master lock 760 has provided access to the recliner sofa system 102, the passenger may selectively deploy or stow the recliner sofa system 102 as desired.

Figure 8:
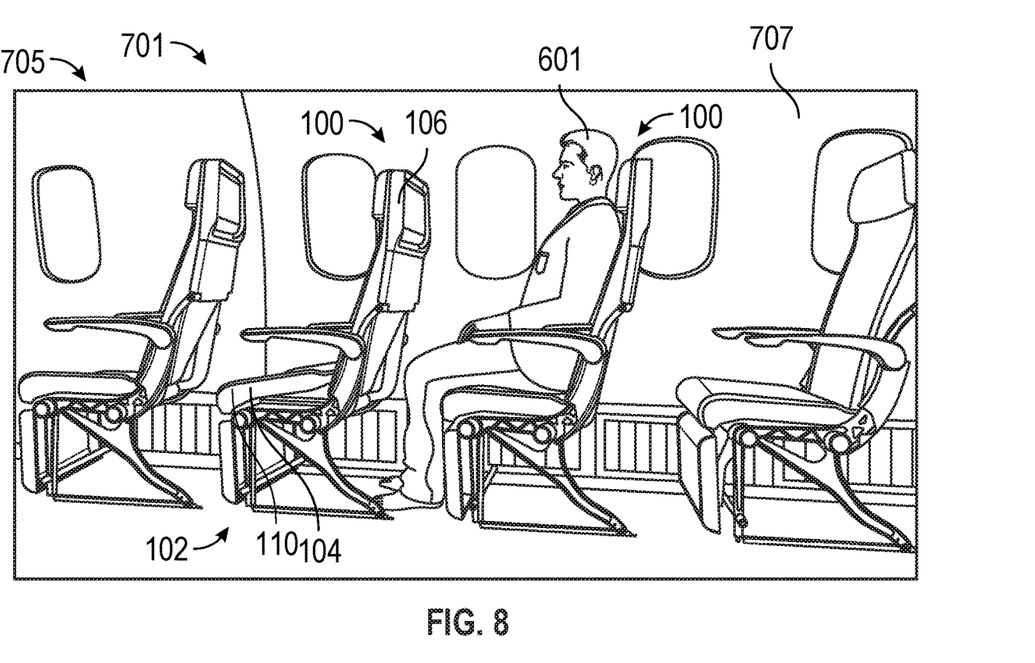
FIG. 8 is a perspective view of the passenger seat arrangement of FIG. 7 with the recliner sofa system being deployed.
Figure 9:
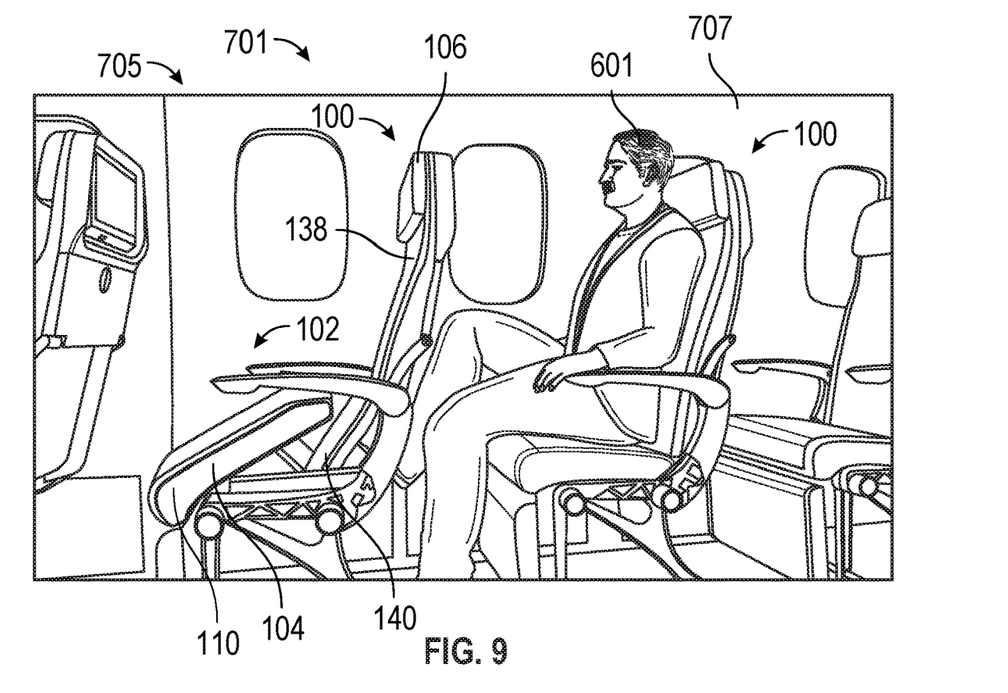
FIG. 9 is a perspective view of the passenger seat arrangement of FIG. 7 with the recliner sofa system being deployed.
Figure 10:
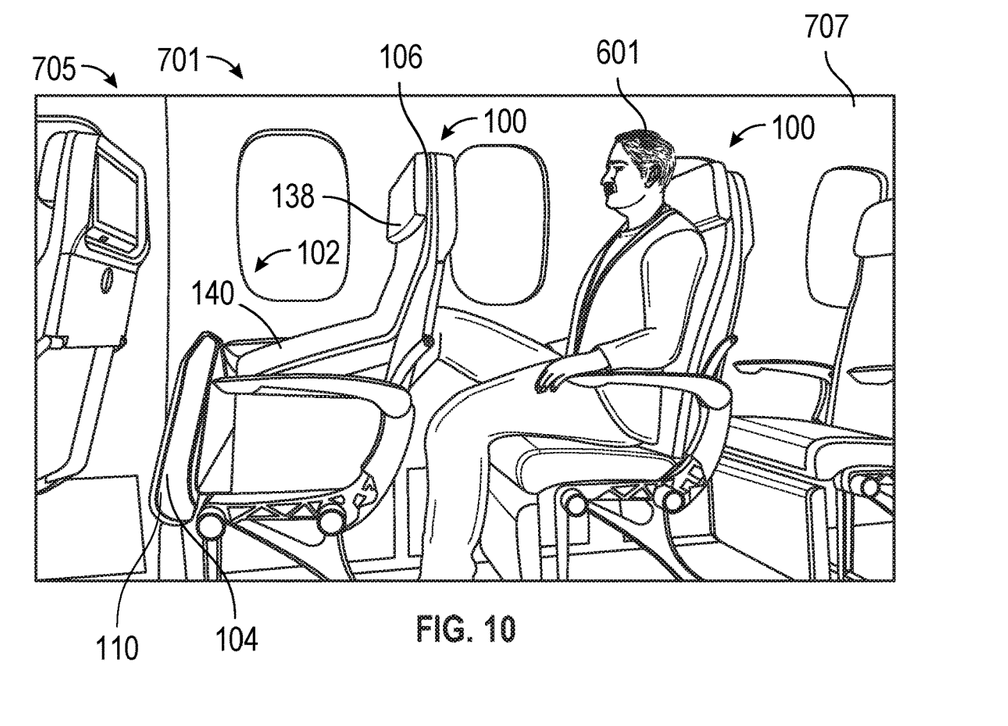
FIG. 10 is a perspective view of the passenger seat arrangement of FIG. 7 with the recliner sofa system being deployed.
Figure 11:
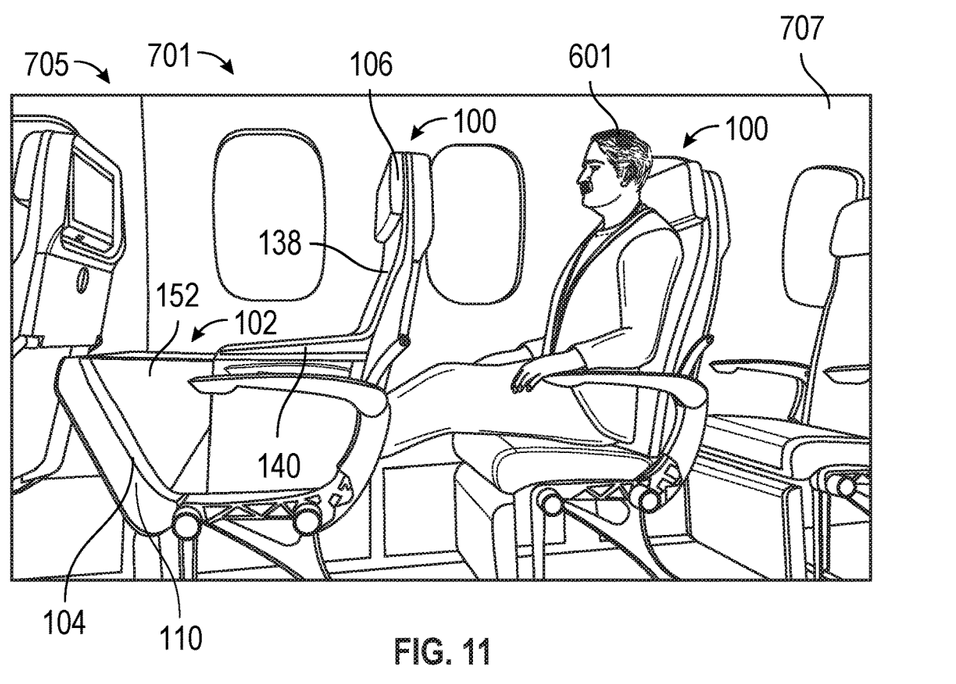
FIG. 11 is a perspective view of the passenger seat arrangement of FIG. 7 with the recliner sofa system deployed.
Figure 12:
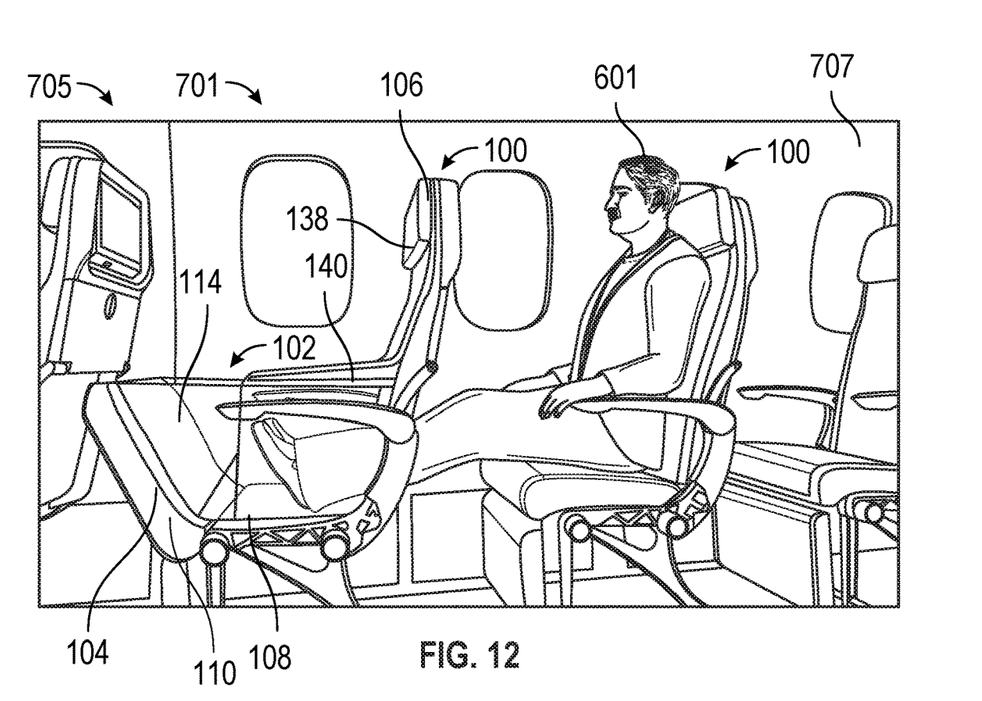
FIG. 12 is another perspective view of the passenger seat arrangement of FIG. 7 with the recliner sofa system deployed.

FIG. 8 illustrates the recliner sofa system 102 after it has been unlocked by the master lock and the seat base 110 and lower back support 140 have been moved to an intermediate deployed position. FIGS. 9 and 10 illustrate additional deployment of the recliner sofa system 102 to additional intermediate deployment positions. As illustrated in FIGS. 9 and 10, the passenger 601 may at least partially move the seat base 110 and/or lower back support 140 to deploy the recliner sofa system 102. FIGS. 11 and 12 illustrate the recliner sofa system 102 with the seat base 110 and lower back support 140 in the fully deployed positions to define the foot cavity 114 such that the passenger 601 can position her or his feet within the foot cavity 114.

Through the recliner sofa system 102, a passenger seat assembly 100 can be transformed into a space suitable for a passenger to adopt a full recline position. In particular, through the movement of the seat base 110 and lower back support 140, a generally horizontal sofa-style surface can be offered to an aft passenger seat to support his or her lower body in a more comfortable position. As such, an airline can optimize the usage of cabin space by adding value to the passenger's flight experience while also creating new revenue stream from an otherwise unoccupied seat. For example, during a flight, if a forward passenger seat is not occupied, the passenger in the aft seat may choose to upgrade his or her seat by paying a fee to move the forward seat base 110 and lower back support 140 into the deployed configuration. Alternatively, such a selection may be available when booking. In addition, the recliner sofa system 102 allows for airlines to quickly and easily customize which seats are in a standard economy configuration and which are in a premium configuration (e.g., with the deployed cushion). Through the recliner sofa system, it is possible for a passenger to raise his or her legs to a horizontal position, and the recliner sofa system only requires one free seat in front of the passenger. By tilting the seat base forward and pivoting the lower back support, an opening is provided through a forward passenger seat that gives access to a foot cavity or surface in front of the passenger while maintaining the structural integrity of the seat back. In some cases, the foot cavity may be formed during TTL events or during non-TTL events.

A method of using the recliner sofa system is also provided. In various examples, the method includes unlocking the seat base and lower back support. In certain aspects, unlocking the seat base and lower back support may include receiving payment and sending an electronic signal, using a mechanical key, or various other suitable mechanisms. The method includes pivoting the seat base and lower back support such that the seat base and lower back support are moved from the stowed configuration to the deployed configuration. In certain cases, the method includes deploying a covering member while deploying the seat base and lower back support. The method may optionally include locking the position of the seat base and lower back support with one or more locking mechanisms. After a passenger has used the recliner sofa system (e.g., at the end of a flight), the method may include stowing the seat base and lower back support by rotating the seat base and lower back support to the stowed configurations.

A collection of exemplary examples providing additional description of a variety of example types in accordance with the concepts described herein are provided below. These examples are not meant to be mutually exclusive, exhaustive, or restrictive; and the invention is not limited to these example examples but rather encompasses all possible modifications and variations within the scope of the issued claims and their equivalents.

Example 1

A passenger seat assembly comprising: a seat back assembly comprising an upper back support and a lower back support, wherein the lower back support is movable relative to the upper back support between a stowed position and a deployed position; and a seat base assembly comprising a support and a seat base, wherein the seat base is movable relative to the support between a stowed position and a deployed position, wherein the seat base in the deployed position and the lower back support in the deployed position together define a foot cavity configured to receive a foot of a passenger.

Example 2

The passenger seat assembly of any of the preceding or subsequent examples, wherein the support of the seat base assembly comprises a forward end and an aft end, and wherein the seat base is movably connected to the forward end of the support.

Example 3

The passenger seat assembly of any of the preceding or subsequent examples, further comprising a covering member connecting the lower back support of the seat back assembly with the seat base, and wherein the covering member at least partially defines the foot cavity when the seat base and lower back support are both in the deployed position.

Example 4

The passenger seat assembly of any of the preceding or subsequent examples, wherein the covering member comprises a top cover and a side cover.

Example 5

The passenger seat assembly of any of the preceding or subsequent examples, wherein the seat back assembly further comprises a frame supporting the upper back support and the lower back support, and wherein, when the lower back support is in the deployed position, an opening to the foot cavity is defined in the frame.

Example 6

The passenger seat assembly of any of the preceding or subsequent examples, wherein the seat base is further movable to an intermediate deployed position between the stowed position and the deployed position, wherein the lower back support is further movable to an intermediate deployed position between the stowed position and the deployed position, wherein the seat base in the intermediate deployed position and the lower back support in the intermediate deployed position together define an intermediate foot cavity configured to receive a foot of a passenger, and wherein a size of the intermediate foot cavity is less than a size of the foot cavity.

Example 7

The passenger seat assembly of any of the preceding or subsequent examples, wherein the seat base comprises a base cushion and a seat pan, and wherein the support further comprises a support cushion.

Example 8

A passenger seat assembly comprising: a seat back assembly comprising a frame supporting an upper back support and a lower back support, wherein the lower back support is movable relative to the upper back support between a stowed position and a deployed position; and a seat base assembly comprising a support and a seat base, wherein the seat base is movable relative to the support between a stowed position and a deployed position, wherein the seat base in the deployed position and the lower back support in the deployed position together define an opening through the frame.

Example 9

The passenger seat assembly of any of the preceding or subsequent examples, wherein the lower back support is movable in a forward direction relative to the lower back support during a deployment motion of the lower back support from the stowed position to the deployed position, and wherein the seat base is movable in the forward direction relative to the support during a deployment motion of the seat base from the stowed position to the deployed position.

Example 10

The passenger seat assembly of any of the preceding or subsequent examples, further comprising a covering member connecting the lower back support of the seat back assembly with the seat base such that the lower back support is movable with the seat base.

Example 11

The passenger seat assembly of any of the preceding or subsequent examples, wherein the covering member, lower back support, and seat base together define a foot cavity configured to receive a foot of a passenger when the lower back support is in the deployed position and the seat base is in the deployed position, and wherein the opening through the frame provides access to the foot cavity.

Example 12

The passenger seat assembly of any of the preceding or subsequent examples, wherein the covering member comprises a top cover and a side cover.

Example 13

The passenger seat assembly of any of the preceding or subsequent examples, further comprising a lock configured to selectively retain the lower back support and the seat base in the stowed position.

Example 14

The passenger seat assembly of any of the preceding or subsequent examples, wherein the seat base assembly further comprises a biasing member biasing the seat base towards the deployed position.

Example 15

A passenger seat arrangement comprising: a forward passenger seat comprising: a seat back assembly comprising an upper back support and a lower back support, wherein the lower back support is movable relative to the upper back support between a stowed position and a deployed position;

and a seat base assembly comprising a support and a seat base, wherein the seat base is movable relative to the support between a stowed position and a deployed position; and an aft passenger seat, wherein the seat base in the deployed position and the lower back support in the deployed position together define a foot cavity for the aft passenger seat.

Example 16

The passenger seat arrangement of any of the preceding or subsequent examples, wherein the seat base in the deployed position and lower back support in the deployed position further define an opening through a frame of the seat back assembly providing access to the foot cavity.

Example 17

The passenger seat arrangement of any of the preceding or subsequent examples, wherein the forward passenger seat further comprises a covering member connecting the lower back support with the seat base, and wherein the covering member at least partially defines the foot cavity.

Example 18

The passenger seat arrangement of any of the preceding or subsequent examples, wherein the covering member comprises a non-rigid material.

Example 19

The passenger seat arrangement of any of the preceding or subsequent examples, wherein the lower back support is movable in a forward direction from the stowed position to the deployed position, and wherein the seat base is movable in the forward direction from the stowed position to the deployed position.

Example 20

The passenger seat arrangement of any of the preceding or subsequent examples, wherein, in the deployed position, the seat base is at an oblique angle relative to the support.

Example 21

A passenger seat comprising: a seat back assembly comprising a frame, an upper back support, and a lower back support, wherein the lower back support is movable relative to the upper back support between a stowed position and a deployed position, and wherein, in the deployed position, the lower back support defines an opening through the frame.

Example 22

A passenger seat assembly comprising: a seat base assembly comprising a support and a seat base, wherein the seat base is movable relative to the support between a stowed position and a deployed position, and wherein the seat base in the deployed position at least partially defines a foot cavity configured to receive a foot of a passenger.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat assembly comprising:
   a seat back assembly comprising an upper back support and a lower back support, wherein the lower back support is movable relative to the upper back support between a stowed position and a deployed position; and
   a seat base assembly comprising a support and a seat base, wherein the seat base is movable relative to the support between a stowed position and a deployed position,
   wherein the seat base in the deployed position and the lower back support in the deployed position together define a foot cavity configured to receive a foot of a passenger; and
   a covering member connecting the lower back support of the seat back assembly with the seat base, and wherein the covering member at least partially defines the foot cavity when the seat base and lower back support are both in the deployed position.

2. The passenger seat assembly of claim 1, wherein the support of the seat base assembly comprises a forward end and an aft end, and wherein the seat base is movably connected to the forward end of the support.

3. The passenger seat assembly of claim 1, wherein the covering member comprises a top cover and a side cover.

4. The passenger seat assembly of claim 1, wherein the seat back assembly further comprises a frame supporting the upper back support and the lower back support, and wherein, when the lower back support is in the deployed position, an opening to the foot cavity is defined in the frame.

5. The passenger seat assembly of claim 1, wherein the seat base is further movable to an intermediate deployed position between the stowed position and the deployed position, wherein the lower back support is further movable to an intermediate deployed position between the stowed position and the deployed position, wherein the seat base in the intermediate deployed position and the lower back support in the intermediate deployed position together define an intermediate foot cavity configured to receive a foot of a passenger, and wherein a size of the intermediate foot cavity is less than a size of the foot cavity.

6. The passenger seat assembly of claim 1, wherein the seat base comprises a base cushion and a seat pan, and wherein the support further comprises a support cushion.

7. A passenger seat assembly comprising:
   a seat back assembly comprising a frame supporting an upper back support and a lower back support, wherein the lower back support is movable relative to the upper back support between a stowed position and a deployed position;
   a seat base assembly comprising a support and a seat base, wherein the seat base is movable relative to the support between a stowed position and a deployed position,
   wherein the seat base in the deployed position and the lower back support in the deployed position together define an opening through the frame; and a covering member connecting the lower back support of the seat back assembly with the seat base, and wherein the covering member at least partially defines a foot cavity when the seat base and lower back support are both in the deployed position.

8. The passenger seat assembly of claim 7, wherein the lower back support is movable in a forward direction relative to the lower back support during a deployment motion of the lower back support from the stowed position to the deployed position, and wherein the seat base is movable in the forward direction relative to the support during a deployment motion of the seat base from the stowed position to the deployed position.

9. The passenger seat assembly of claim 7, further comprising a covering member connecting the lower back support of the seat back assembly with the seat base such that the lower back support is movable with the seat base.

10. The passenger seat assembly of claim 7, further comprising a lock configured to selectively retain the lower back support and the seat base in the stowed position.

11. The passenger seat assembly of claim 7, wherein the seat base assembly further comprises a biasing member biasing the seat base towards the deployed position.

12. A passenger seat arrangement comprising:
a forward passenger seat comprising:
   a seat back assembly comprising an upper back support and a lower back support, wherein the lower back support is movable relative to the upper back support between a stowed position and a deployed position; and
   a seat base assembly comprising a support and a seat base, wherein the seat base is movable relative to the support between a stowed position and a deployed position;
an aft passenger seat,
wherein the seat base in the deployed position and the lower back support in the deployed position together define a foot cavity for the aft passenger seat; and a covering member connecting the lower back support of the sweat back assembly with the seat base, and wherein the covering member at least partially defines the foot cavity when the seat based and lower back support are both in the deployed position.

13. The passenger seat arrangement of claim 12, wherein the seat base in the deployed position and lower back support in the deployed position further define an opening through a frame of the seat back assembly providing access to the foot cavity.

14. The passenger seat arrangement of claim 12, wherein the covering member comprises a non-rigid material.

15. The passenger seat arrangement of claim 12, wherein the lower back support is movable in a forward direction from the stowed position to the deployed position, and wherein the seat base is movable in the forward direction from the stowed position to the deployed position.

16. The passenger seat arrangement of claim 12, wherein, in the deployed position, the seat base is at an oblique angle relative to the support.

* * * * *